US011682092B2

(12) United States Patent
Colevas et al.

(10) Patent No.: US 11,682,092 B2
(45) Date of Patent: Jun. 20, 2023

(54) UPDATING A DOCUMENT BASED ON TRANSACTION ANALYSIS

(71) Applicant: Capital One Services, LLC, McLean, VA (US)

(72) Inventors: Alexandra Colevas, Arlington, VA (US); Sophie Bermudez, Washington, DC (US); Kaylyn Gibilterra, New York, NY (US); Sarah J. Cunningham, Arlington, VA (US); Salik Shah, Washington, DC (US); Michael Saia, New York, NY (US)

(73) Assignee: Capital One Services, LLC, McLean, VA (US)

( * ) Notice: Subject to any disclaimer, the term of this patent is extended or adjusted under 35 U.S.C. 154(b) by 247 days.

(21) Appl. No.: 17/301,579

(22) Filed: Apr. 8, 2021

(65) Prior Publication Data
US 2021/0224939 A1    Jul. 22, 2021

Related U.S. Application Data

(63) Continuation of application No. 16/387,048, filed on Apr. 17, 2019, now Pat. No. 10,984,495.

(51) Int. Cl.
*G06Q 50/18* (2012.01)
*G06N 20/20* (2019.01)
*G06F 40/55* (2020.01)

(52) U.S. Cl.
CPC ........... *G06Q 50/186* (2013.01); *G06F 40/55* (2020.01); *G06N 20/20* (2019.01)

(58) Field of Classification Search
USPC ....................................................... 705/312
See application file for complete search history.

(56) References Cited

U.S. PATENT DOCUMENTS

| 10,984,495 | B2 | 4/2021 | Colevas et al. |
| 2017/0124487 | A1 | 5/2017 | Szeto et al. |
| 2018/0205546 | A1* | 7/2018 | Haque ................... H04L 9/3213 |

FOREIGN PATENT DOCUMENTS

| EP | 1126392 A2 * | 8/2001 | ........... G06F 16/972 |
| EP | 1126392 A2 | 8/2001 | |

OTHER PUBLICATIONS

Q. Sun, L. Fu, B. Deng and J. Sun, "An efficient transaction processing method on the distributed database," 2016 9th International Congress on Image and Signal Processing, BioMedical Engineering and Informatics (CISP-BMEI), Datong, 2016, pp. 1916-1920, doi: 10.1109/CISP-BMEI.2016.7853031 (Year: 2016).*

(Continued)

*Primary Examiner* — Michael Young
(74) *Attorney, Agent, or Firm* — Harrity & Harrity, LLP

(57) ABSTRACT

A platform receives transaction information for an entity, where the transaction information identifies a plurality of transactions associated with the entity, and receives entity information associated with the entity. The platform identifies, using a first model, a selected set of transactions based on the transaction information and the entity information, where the first model outputs information identifying the selected set of transactions based on the selected set of transactions being associated with an event, a theme, or a transaction parameter. The platform determines, using a second model, potential modifications to a document based on the selected set of transactions, where the second model receives the information identifying the selected set of transactions or information identifying the event, the theme, or the transaction parameter, and where the second model outputs information identifying the potential modifications. The platform provides the information identifying the potential modifications.

20 Claims, 9 Drawing Sheets

(56) References Cited

OTHER PUBLICATIONS

Sun Q., et al., "An Efficient Transaction Processing Method on the Distributed Database," 2016 9th International Congress on Image and Signal Processing, Bio Medical Engineering and Informatics (CISP-BMEI), Datong, 2016, pp. 1916-1920.

* cited by examiner

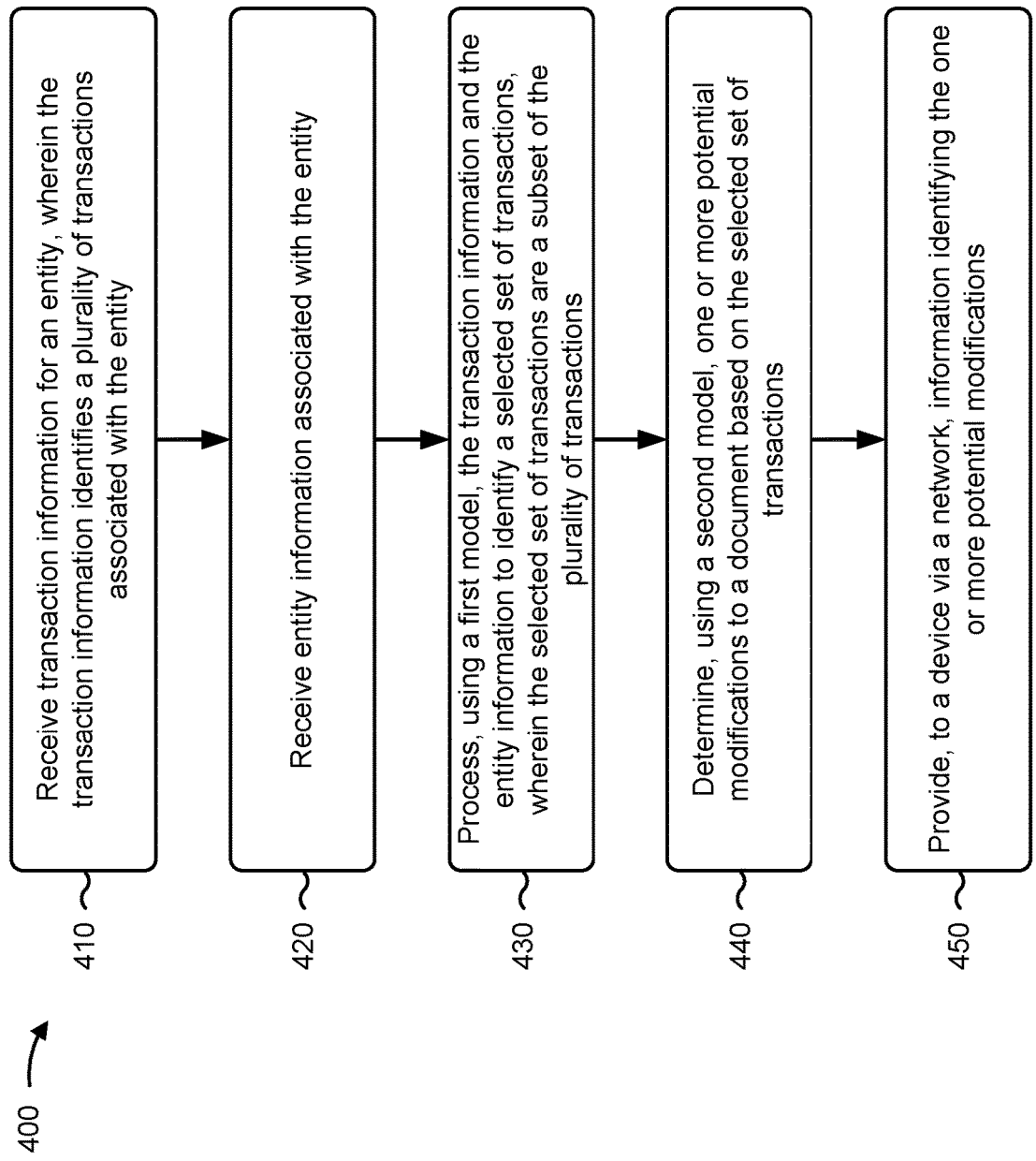

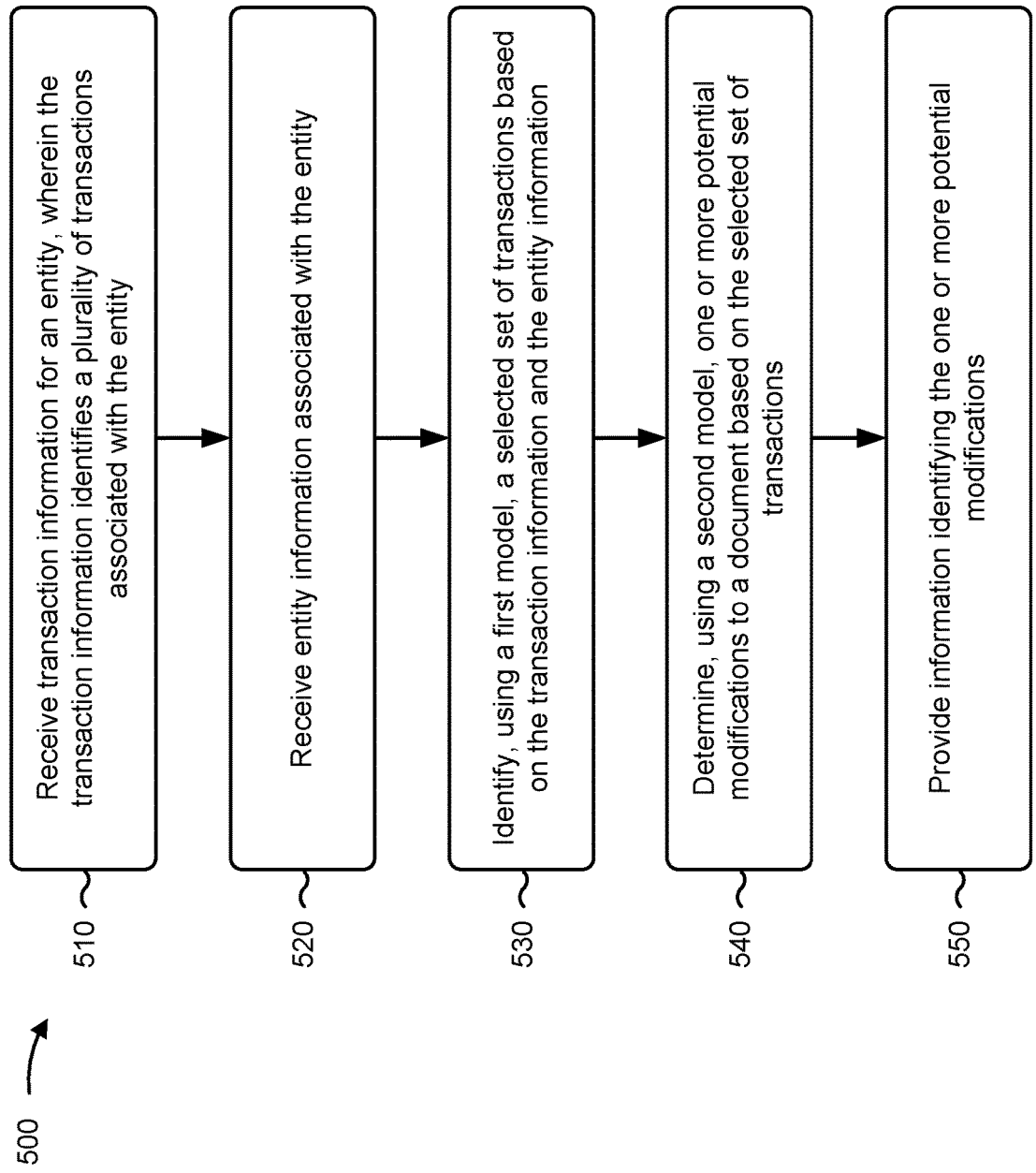

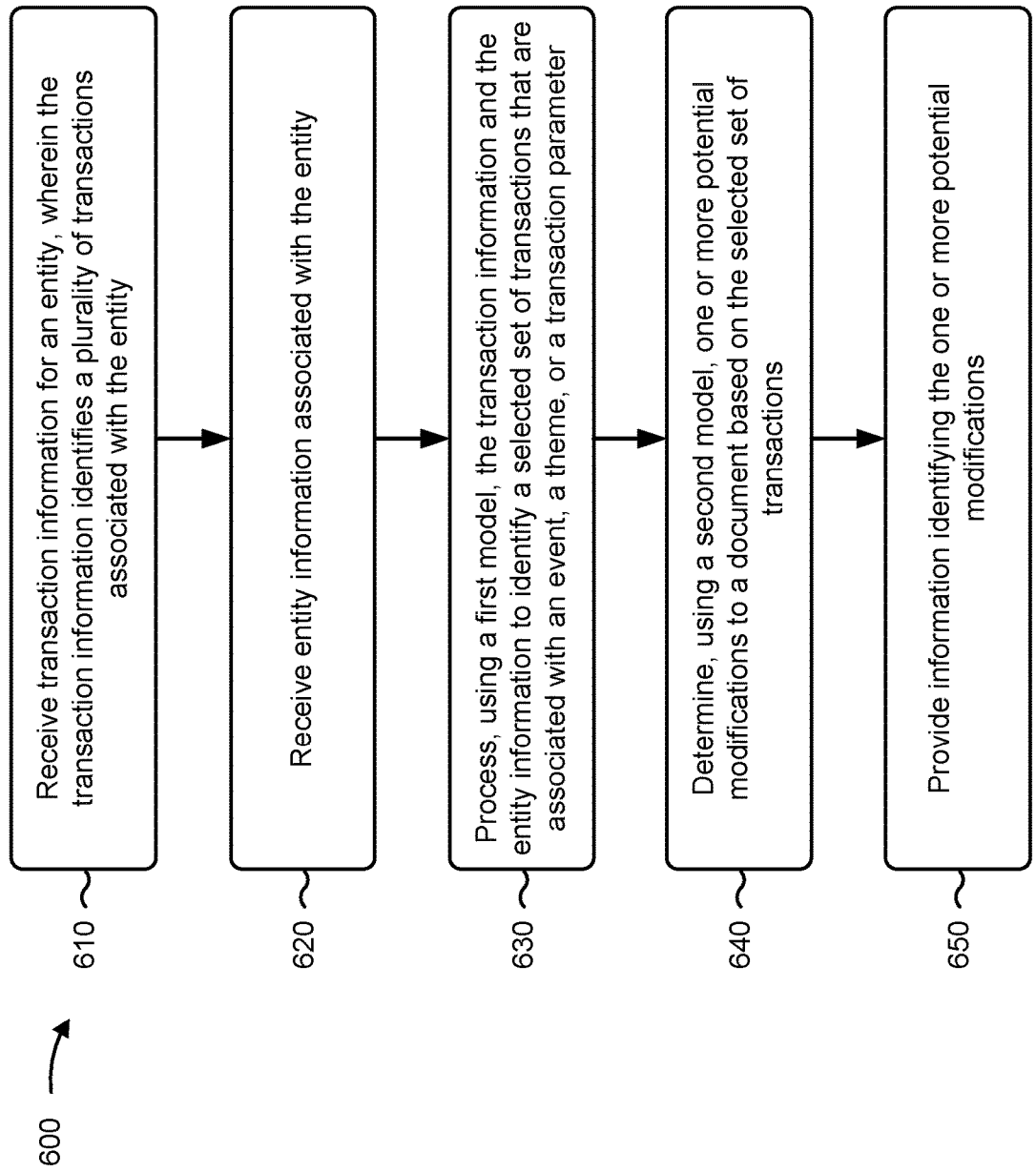

UPDATING A DOCUMENT BASED ON TRANSACTION ANALYSIS

RELATED APPLICATION

This application is a continuation of U.S. patent application Ser. No. 16/387,048, filed Apr. 17, 2019 (now U.S. Pat. No. 10,984,495), which is incorporated herein by reference in its entirety.

BACKGROUND

A will or testament is a legal document by which a person (i.e., the testator) expresses their wishes as to how their property is to be distributed upon the death of the testator. After creation of the will and during the life of the testator, the testator may modify the will to reflect changing wishes and/or circumstances.

SUMMARY

According to some implementations, a method may include receiving, by a platform, transaction information for an entity, wherein the transaction information identifies a plurality of transactions associated with the entity, and receiving, by the platform, entity information associated with the entity. The method may include processing, by the platform and using a first model, the transaction information and the entity information to identify a selected set of transactions, wherein the selected set of transactions are a subset of the plurality of transactions, wherein the first model receives, as input, the transaction information and the entity information, and wherein the first model outputs information identifying the selected set of transactions based on the selected set of transactions being associated with an event, a theme, or a transaction parameter. The method may include determining, by the platform and using a second model, one or more potential modifications to a document based on the selected set of transactions, wherein the second model receives the information identifying the selected set of transactions or information identifying the event, the theme, or the transaction parameter, and wherein the second model outputs information identifying the one or more potential modifications. The method may include providing, by the platform and via a network, information identifying the one or more potential modifications.

According to some implementations, a platform may include one or more memories, and one or more processors, communicatively coupled to the one or more memories, to receive transaction information for an entity, wherein the transaction information identifies a plurality of transactions associated with the entity, and to receive entity information associated with the entity. The one or more processors may identify, using a first model, a selected set of transactions based on the transaction information and the entity information, wherein the first model outputs information identifying the selected set of transactions based on the selected set of transactions being associated with an event, a theme, or a transaction parameter. The one or more processors may determine, using a second model, one or more potential modifications to a document based on the selected set of transactions, wherein the second model receives the information identifying the selected set of transactions or information identifying the event, the theme, or the transaction parameter, and wherein the second model outputs information identifying the one or more potential modifications. The one or more processors may provide information identifying the one or more potential modifications.

According to some implementations, a non-transitory computer-readable medium may store instructions that include one or more instructions that, when executed by one or more processors of a platform, cause the one or more processors to receive transaction information for an entity, wherein the transaction information identifies a plurality of transactions associated with the entity, and to receive entity information associated with the entity. The one or more instructions may cause the one or more processors to process, using a first model, the transaction information and the entity information to identify a selected set of transactions that are associated with an event, a theme, or a transaction parameter. The one or more instructions may cause the one or more processors to determine, using a second model, one or more potential modifications to a document based on the selected set of transactions, wherein the second model receives the information identifying the selected set of transactions or information identifying the event, the theme, or the transaction parameter, and wherein the second model outputs information identifying the one or more potential modifications. The one or more instructions may cause the one or more processors to provide information identifying the one or more potential modifications.

BRIEF DESCRIPTION OF THE DRAWINGS

FIG. 4 is a flow chart of an example process for updating a document based on transaction analysis.

FIG. 5 is a flow chart of an example process for updating a document based on transaction analysis.

FIG. 6 is a flow chart of an example process for updating a document based on transaction analysis.

DETAILED DESCRIPTION

Figure 1A:
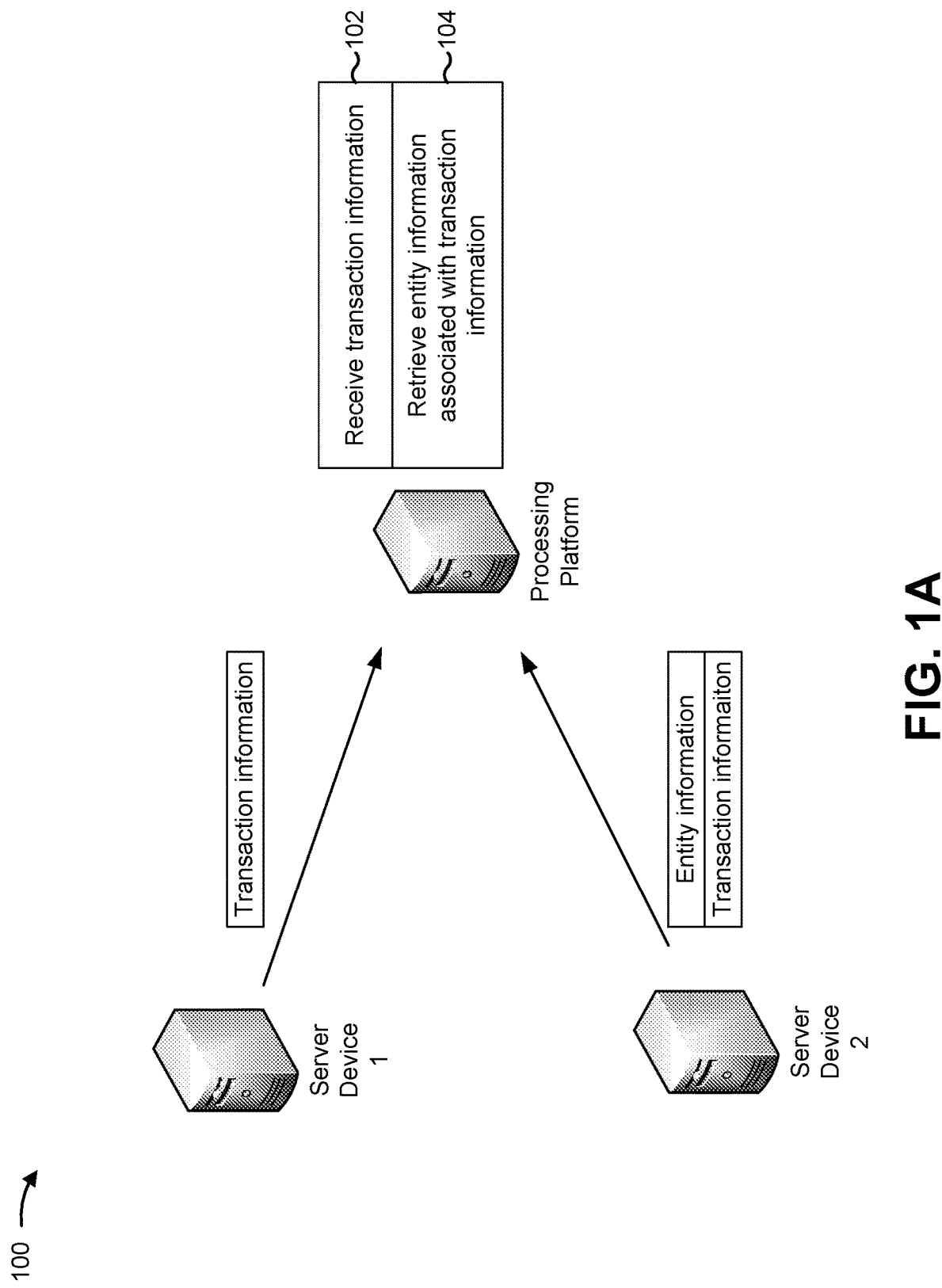
FIGS. 1A-1D are diagrams of one or more example implementations described herein.

The following detailed description of example implementations refers to the accompanying drawings. The same reference numbers in different drawings may identify the same or similar elements.

A person (sometimes referred to herein as an entity) may provide instruction or guidance for the distribution of the person's property at their death using a document such as a will, a testament, a trust, and/or the like. The document may name another person to manage the estate until distribution (e.g., an executor). "Will," "testament," and "trust" may be used interchangeably herein.

Wills are sometimes poorly maintained. For example, many wills are not regularly updated to account for changes in circumstance, large purchases, and/or the like. Furthermore, it may not occur to a person to provide a charitable donation in their will due to unfamiliarity with the process of arranging a donation, lack of history of donating, and/or the like. Still further, it may be burdensome to update the will in connection with these events. Even further, a part of a will that is legally effective in one jurisdiction may not be legally effective in another jurisdiction (e.g., a distribution of an asset, etc.). In some cases, poorly maintaining a will can lead to inefficient use of computer resources to update the will (e.g., making a change and changing the will again because of changed circumstances, fixing issues that are discovered in the will, etc.), to attempt to enforce the will, to identify modifications to make to a will, to research how to make modifications to a will to match an intent of the entity, and/or the like. In some cases, inaccurate or inefficient tracking of events can lead to inefficient use of computer resources to determine which of these events impacts the will, what modifications to make to a will, how to make these modifications to benefit the entity, and/or the like.

Some implementations described herein may train a first model using a dataset of transactions (e.g., financial transaction information, consumer transaction information, etc.), entity information associated with the transactions, and events, themes, or transaction parameters relating to the transactions. The first model may identify sets of transactions that are associated with a theme, event, or transaction parameter. For example, the theme, event, or transaction parameter may be of a type that may be associated with a change to a document (e.g., a will), such as a large purchase, a marriage, a charitable donation, a pattern of transactions that might suggest a charitable donation, a move from one jurisdiction to another, and/or the like. Some implementations described herein may use the first model to identify a selected set of transactions, of transaction information associated with an entity, or to identify the theme, event, or transaction parameter associated with the transaction information.

Some implementations described herein may train a second model using a dataset of documents (e.g., wills, parts of wills, etc.), entity information (e.g., information associated with entities corresponding to the documents), and the set of selected transactions (e.g., or the theme, event, or transaction parameter associated with the set of selected transactions). The second model may output information indicating potential modifications to the entity's document based on the set of selected transactions. In some implementations, the second model may identify a potential modification based on a change in jurisdiction, a pattern of related transactions, and/or the like. Some implementations described herein may perform a potential modification with regard to a document, may provide information identifying the potential modification to a subject matter expert (e.g., an attorney associated with the entity, etc.), and/or the like.

In this way, modifications to a document may be indicated using entity information and transaction information associated with an entity. For example, several different stages of a process for identifying modifications to a will based on transaction information and entity information are automated, which may remove human subjectivity and waste from the process, and which may improve speed and efficiency of the process and conserve computing resources (e.g., processor resources, memory resources, and/or the like). Furthermore, some implementations described herein use a rigorous, computerized process to perform tasks or activities that were not previously performed. For example, previously, there did not exist a technique to identify modifications to a will based on transaction information and entity information associated with an entity that performs the transactions. Accordingly, computing resources associated with manually identifying modifications to a will, as described herein, are conserved. Finally, automating the process for identifying potential modifications to a will, as described herein, conserves computing resources (e.g., processor resources, memory resources, and/or the like) that would otherwise be wasted by a user manually identifying modifications to a will.

Thus, computer resources may be conserved by efficiently updating the will, efficiently and automatically identifying modifications to the will, and reducing the amount of research to be performed regarding how to make effective modifications to the will. Furthermore, utilization of computer resources for tracking events associated with will modification may be improved, since the efficiency and accuracy of tracking these events may be improved.

FIGS. 1A-1D are diagrams of one or more example implementations 100 described herein. As shown, implementation(s) 100 includes a server device 1, a server device 2, a processing platform, and a user device (shown in FIG. 1D). While the processing platform is shown as a device, in some implementations, the processing platform may be provided using a cloud computing environment, as described in more detail elsewhere herein.

As shown in FIG. 1A, and by reference number 102, the processing platform may receive transaction information from one or more server devices. Here, the processing platform receives a first set of transaction information from server device 1 and a second set of transaction information from server device 2. However, the implementations described herein are not limited to those in which transaction information is received from two server devices. For example, the transaction information may be received from any number of sources and/or server devices.

The transaction information may include information identifying or relating to transactions associated with an entity. For example, the transaction information may include information indicating a purchase (e.g., an asset, such as a product, a house, land, etc., a service, and/or the like), information indicating a sale (e.g., of an asset), financial information associated with a purchase or sale (e.g., information indicating an amount charged for the item, the account of the entity used for the purchase, an invoice identifier, a confirmation number, a transaction type, and/or the like), credit card transaction information, checking account transaction information, financial software information (e.g., information exported from an entity's financial software), and/or the like.

In some implementations, the processing platform may receive the transaction information from multiple, different sources (e.g., multiple accounts, multiple financial institutions, etc.). In some implementations, the processing platform may retrieve transaction information, such as by accessing a user account of the entity using credentials associated with the entity. In some implementations, the processing platform may receive the transaction information as a data stream. For example, the processing platform may receive transaction information as the transactions are performed or processed (e.g., hundreds of transactions, thousands of transactions, millions of transactions, etc.), and may perform the operations described herein in real time as the transactions are performed or processed. In such a case, the processing platform may index information regarding processed transaction information that can be used to identify selected sets of transactions, as described in more detail below. This may conserve storage or memory resources of the processing platform that would otherwise be used to store batches of transaction information.

In some implementations, the processing platform may perform natural language processing on the transaction information so that the transaction information is in a machine-readable format. For example, the processing platform may perform natural language processing on the transaction information to generate natural language processing results, and may analyze the natural language processing results to identify information included in the transaction information. Natural language processing involves techniques performed (e.g., by a computer system) to analyze, understand, and derive meaning from human language in a useful way. Natural language processing can be applied to analyze text, allowing machines to understand how humans speak, enabling real world applications such as automatic text summarization, sentiment analysis, topic extraction, named entity recognition, parts-of-speech tagging, relationship extraction, stemming, and/or the like.

As shown by reference number 104, the processing platform may receive entity information. The entity information may include information associated with an entity, such as location information (e.g., an address of the entity, a jurisdiction in which the entity is located, locations associated with transactions associated with the entity, etc.), information identifying persons associated with the entity (e.g., a family member associated with the entity, a representative of the entity, an attorney of the entity, etc.), information identifying accounts associated with the entity (e.g., accounts associated with transaction information, etc.), communications associated with the entity (e.g., email messages, text messages, voice message transcriptions, etc.), membership information (e.g., identifying an organization of which the entity is a member), and/or the like.

In some implementations, the processing platform may receive the entity information based on a user input. For example, the entity or another user may input at least part of the entity information, or may provide input indicating whether entity information determined by the processing platform is accurate. In some implementations, the processing platform may retrieve the entity information. For example, the processing platform may retrieve the entity information based on accessing an account associated with the entity using credentials associated with the entity (e.g., after gaining permission from the entity to access the account). In some implementations, the processing platform may receive the entity information as a data stream. For example, when the entity information relates to communications, the processing platform may receive the entity information as communications are performed, and may perform the operations described herein in real time as the entity information is received. In such a case, the processing platform may index information determined based on the entity information, which may be used to identify selected sets of transactions and/or potential modifications to a document, as described in more detail elsewhere herein. Thus, storage or memory resources of the processing platform that would otherwise be used to store large datasets of entity information may be conserved.

In some aspects, the processing platform may retrieve entity information associated with transaction information. For example, the processing platform may identify a set of entity information that is to be retrieved based on the transaction information, and may retrieve the set of entity information. In some implementations, the processing platform may retrieve the entity information based on a date associated with transaction information. For example, the processing platform may retrieve entity information associated with a range of dates that matches a range of dates of the transaction information. As another example, the processing platform may identify a particular transaction (e.g., based on a size of the transaction, a dollar amount associated with the transaction, a counterparty of the transaction, a location associated with the transaction, and/or the like), and may retrieve entity information pertinent to that transaction (e.g., emails associated with the particular transaction, etc.).

Thus, the processing platform may identify particular entity information that is to be retrieved, thereby reducing the volume of entity information to be processed by the processing platform and conserving resources of the processing platform.

In some implementations, the processing platform may perform natural language processing on the entity information so that the entity information is in a machine-readable format. For example, the processing platform may perform natural language processing on the entity information to generate natural language processing results, and may analyze the natural language processing results to identify information included in the entity information. Natural language processing involves techniques performed (e.g., by a computer system) to analyze, understand, and derive meaning from human language in a useful way. Natural language processing can be applied to analyze text, allowing machines to understand how humans speak, enabling real world applications such as automatic text summarization, sentiment analysis, topic extraction, named entity recognition, parts-of-speech tagging, relationship extraction, stemming, and/or the like. The usage of natural language processing results for the entity information and the transaction information is described in more detail below.

Figure 1B:
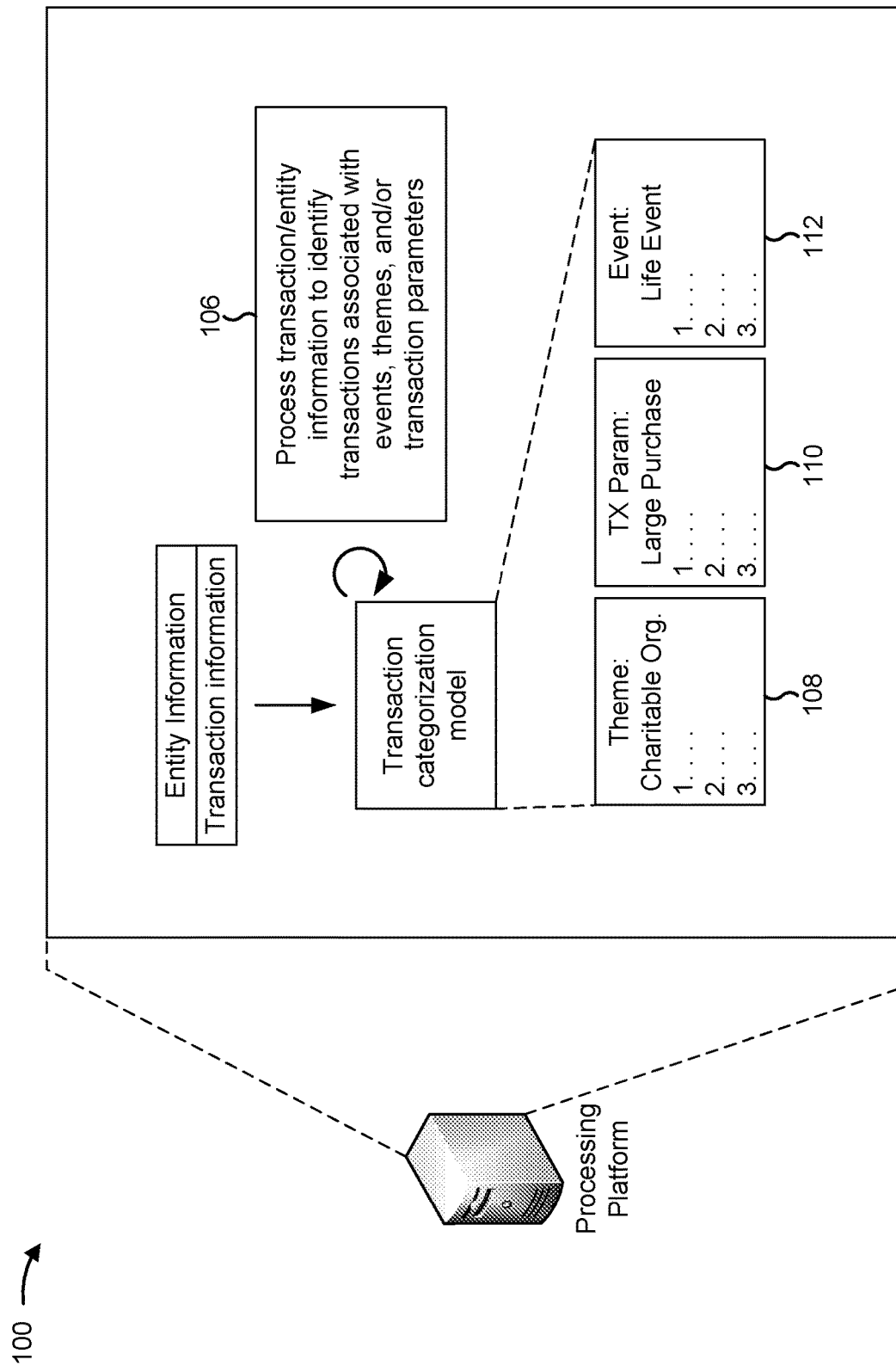

As shown in FIG. 1B, and by reference number 106, the processing platform may process transaction information and entity information to identify transactions associated with events, themes, and/or transaction parameters. For example, the processing platform may process the transaction information and the entity information using a model, shown here as a transaction categorization model. In some implementations, the transaction categorization model may be referred to herein as a first model. As described herein, the processing platform may use one or more artificial intelligence techniques, such as machine learning, deep learning, and/or the like to train the transaction categorization model to identify events, themes, and/or transaction parameters based on entity information and transaction information.

The transaction categorization model may receive, as input, transaction information and entity information. The transaction categorization model may output information identifying a set of transactions associated with an event, a theme, or a transaction parameter. Examples of events, themes, and transaction parameters are provided below.

In some implementations, the processing platform may determine a characteristic of a set of transactions or entity information based on natural language processing of the transaction information and the entity information (e.g., based on natural language processing of a description of the set of transactions or the entity information). For example, based on a transaction with a charitable organization and/or a communication by the entity that includes "Thank you for your donation", the processing platform may use natural language processing to determine that a characteristic of the transaction and/or the communication is that the transaction and/or the communication is associated with an event of a charitable donation. For example, the processing platform may determine that the transaction is with a charitable donation based on the communication, may identify the event based on the transaction and/or the communication, and/or the like. Similarly, based on a transaction involving a home loan in a particular jurisdiction or a communication with a realtor in the particular jurisdiction, the processing platform may identify an event involving a move to the particular jurisdiction. As a third example, based on a transaction or a series of transactions of a particular amount (e.g., a particular monetary amount), the processing platform may determine that the transaction or the series of transactions satisfy a transaction parameter (e.g., a threshold transaction size), and may thereby identify a large asset purchase or sale based on the transaction or the series of transactions satisfying the transaction parameter. The processing platform may use these determinations to identify potential modifications to a document using a second model, as described in more detail below.

In this way, the processing platform may identify characteristics associated with transactions and entity information of an entity to identify potential modifications to a document associated with the entity, as described herein. Based on applying a rigorous and automated process associated with identifying events, themes, or transaction parameters, the processing platform enables recognition and/or identification of thousands or millions of data points of transaction information and/or entity information for thousands or millions of entities, thereby increasing an accuracy and consistency of identification of events, themes, and/or transaction parameters relative to requiring computing resources to be allocated for hundreds or thousands of technicians or professionals to attempt to manually identify such events, themes, or transaction parameters by manually perusing the thousands or millions of data points regarding transactions and/or entity information.

In some implementations, the processing platform may perform a data preprocessing operation when generating the transaction categorization model. For example, the processing platform may preprocess data (e.g., transaction information, entity information, and/or the like) to remove non-ASCII characters, white spaces, confidential data (e.g., health information, information for which the entity has not provided permission or access, and/or the like), and/or the like. In this way, the processing platform may organize thousands, millions, or billions of data entries for machine learning and model generation—a data set that cannot be processed objectively by a human actor.

In some implementations, the processing platform may perform a training operation when generating the transaction categorization model. For example, the processing platform may portion entity information and/or transaction information, and information identifying events, themes, and parameters associated with the entity information and/or the transaction information, into a training set, a validation set, a test set, and/or the like. In some implementations, the processing platform may preprocess and/or perform dimensionality reduction to reduce the data to a minimum feature set. In some implementations, the processing platform may train the transaction categorization model on this minimum feature set, thereby reducing processing to train the machine learning model, and may apply a classification technique, to the minimum feature set. The training set may be used to fit the model. The validation set may be used to provide an evaluation of the model's fit on the training set while tuning model parameters. The test set may be used to provide an evaluation of a final model fit on the training set.

In some implementations, the processing platform may use a classification technique, such as a logistic regression classification technique, a random forest classification technique, a gradient boosting machine learning (GBM) technique, and/or the like, to determine a categorical outcome (e.g., that transaction information and/or entity information is associated with a theme, event, or transaction parameter; that transaction information and/or entity information is not associated with a theme, event, or transaction parameter, and/or the like). Additionally, or alternatively, the processing platform may use a naïve Bayesian classifier technique. In this case, the processing platform may perform binary recursive partitioning to split the data of the minimum feature set into partitions and/or branches and use the partitions and/or branches to perform predictions (e.g., that transaction information and/or entity information is or is not associated with a theme, event, or transaction parameter). Based on using recursive partitioning, the processing platform may reduce utilization of computing resources relative to manual, linear sorting and analysis of data points, thereby enabling use of thousands, millions, or billions of data points to train a model, which may result in a more accurate model than using fewer data points.

Additionally, or alternatively, the processing platform may use a support vector machine (SVM) classifier technique to generate a non-linear boundary between data points in the training set. In this case, the non-linear boundary is used to classify test data (e.g., transaction information and/or entity information) into a particular class (e.g., a class indicating that the transaction information and/or entity information is associated with an event, theme or transaction parameter, a class indicating that the transaction information and/or entity information is not associated with an event, theme or transaction parameter, and/or the like).

Additionally, or alternatively, the processing platform may train the transaction categorization model using a supervised training procedure that includes receiving input to the model from a subject matter expert, which may reduce an amount of time, an amount of processing resources, and/or the like to train the transaction categorization model relative to an unsupervised training procedure. In some implementations, the processing platform may use one or more other model training techniques, such as a neural network technique, a latent semantic indexing technique, and/or the like. For example, the processing platform may perform an artificial neural network processing technique (e.g., using a two-layer feedforward neural network architecture, a three-layer feedforward neural network architecture, and/or the like) to perform pattern recognition with regard to patterns of whether transaction information and/or entity information described using different semantic descriptions is associated with an event, theme, or transaction parameter, or not. In this case, using the artificial neural network processing technique may improve an accuracy of a model (e.g., the transaction categorization model) generated by the processing platform by being more robust to noisy, imprecise, or incomplete data, and by enabling the processing platform to detect patterns and/or trends undetectable to human analysts or systems using less complex techniques.

Accordingly, the processing platform may use any number of artificial intelligence techniques, machine learning techniques, deep learning techniques, and/or the like to determine events, themes, and/or transaction parameters associated with transaction information and/or entity information.

As shown by reference number 108, in some cases, the processing platform may identify a set of transactions and/or entity information associated with a theme. Here, the theme is associated with a charitable organization, and the set of transactions is indicated by a numbered list under the theme. In this case, the theme may identify the charitable organization, or may identify a cause or mission associated with the charitable organization. As an example, the theme may identify the American Society for the Prevention of Cruelty against Animals (ASPCA), or may identify a cause or mission associated with the ASPCA, such as "animal care."

In some implementations, the processing platform may identify the theme of the charitable organization based on a single transaction or a set of transactions with the charitable organization (e.g., based on the entity donating to the charitable organization). In some implementations (e.g., when the theme identifies the cause or mission), the processing platform may identify the theme based on transactions relating to the theme. Continuing the above example, when the theme is "animal care," the processing platform may identify the theme based on transactions relating to animal care, such as a purchase of a pet, veterinary bills, donations to animal care organizations other than the ASPCA, communications regarding a pet or animal care, and/or the like. Thus, the processing platform may identify a theme associated with a set of transaction information and/or entity information (e.g., using one or more of the artificial intelligence techniques described above), which the processing platform may use to identify potential modifications to a document, as described in more detail below.

While some of the themes described herein are associated with a charitable organization, the implementations described herein are not limited to those involving themes associated with charitable organizations. For example, a theme may be associated with education, legal services, and/or the like. As another example, the processing platform may determine that transaction information and/or entity information is associated with a theme of caring for a disabled person, and may identify a theme associated with caring for the disabled person.

As shown by reference number 110, in some implementations, the processing platform may identify a set of transactions and/or entity information associated with a transaction parameter (shown as TX Param). Here, the transaction parameter relates to a large purchase, and the set of transactions and/or entity information is indicated by a numbered list below the transaction parameter. For example, the processing platform may determine that the transaction parameter is satisfied based on a transaction with a transaction size (e.g., in monetary terms) that satisfies a threshold. This may indicate that the transaction is likely to involve the purchase or sale of an asset that should be handled in the document. As another example, the processing platform may determine that the transaction parameter is satisfied based on a threshold number of transactions with a particular counterparty. For example, the processing platform may identify a monthly payment to a servicer in association with a loan, which may indicate that collateral for the loan should be handled in the document. As a third example, the processing platform may determine that the transaction parameter is satisfied based at least in part on a combination of the above (e.g., a threshold number of transactions that, when summed, satisfy a threshold transaction size). Thus, the processing platform may identify a larger asset (e.g., a vehicle) that should be handled in the document, and may not identify a smaller asset (e.g., a cellular phone, an asset purchased from an infomercial, and/or the like) that is associated with a payment plan and that need not be handled in the document.

In some implementations, the processing platform may identify an asset associated with a transaction parameter. For example, the processing platform may identify the asset based on entity information associated with one or more transactions based on which the transaction parameter was determined. As a more particular example, the processing platform may identify a receipt, identified by the entity information, associated with the one or more transactions. The processing platform may identify the receipt based at least in part on an amount identified by the receipt matching the one or more transactions, based on a date associated with the receipt matching dates of the one or more transactions, and/or the like. Thus, the processing platform may identify (e.g., using one or more of the artificial intelligence techniques identified above) an asset associated with a transaction parameter based on a relationship between transaction information and entity information that identifies the asset.

As shown by reference number 112, in some implementations, the processing platform may identify a set of transactions and/or entity information associated with an event. Here, the event is a life event, and the set of transactions and/or entity information is indicated by a numbered list. An event may include, for example, a marriage, a divorce, the birth or adoption of a child, a move from one jurisdiction to another jurisdiction, and/or the like. In some implementations, an event may include any occurrence associated with an entity that can be detected using entity information and/or transaction information and that may be associated with a modification to a document (e.g., a will).

In some implementations, the processing platform may identify an event based on transaction information and/or entity information. For example, the processing platform may identify one or more transactions associated with an event. As a more particular example, the processing platform may identify a childbirth event based on a set of transactions associated with childcare, toys, baby equipment, and/or the like. In some implementations, the processing platform may identify the event using the transaction information and the entity information. For example, the processing platform may identify an event based on a set of transactions with a particular counterparty, and may use the entity information to determine a type of the event (e.g., childbirth, marriage, and so on). In some implementations, the processing platform may identify the event based on a change in entity information. For example, the processing platform may determine that account information associated with an entity indicates that the entity is associated with a new address in a new jurisdiction, a new authorized user associated with an account, a name change of an authorized user, and/or the like.

In some implementations, the processing platform may identify an event based on a move of an entity from a first jurisdiction to a second jurisdiction. For example, the processing platform may identify the event based on transaction information (e.g., based on determining that a threshold number of transactions have been performed in the second jurisdiction, based on determining that a number of transactions in the first jurisdiction fails to satisfy a threshold, based on a sale of a home in the first jurisdiction, based on a purchase of a home in the second jurisdiction, based on a transaction with a particular vendor in the second jurisdiction (e.g., a television provider, a utility company, a telephone company, etc.), and/or the like) and/or based on entity information (e.g., a change in an address of the entity from an address in the first jurisdiction to an address in the second jurisdiction).

In the above examples, the transaction categorization model is described as identifying sets of transactions and/or entity information associated with events, themes, or transaction parameters. In some implementations, the transaction categorization model may determine information identifying events, themes, or transaction parameters based on transaction information and/or entity information. For example, the transaction categorization model may generate a data set that identifies one or more events, themes, and/or transaction parameters. In such a case, the dataset generated by the transaction categorization model may be provided as input to a modification identification model, as described in more detail below. In some implementations, the transaction categorization model may determine the events, themes, or transaction parameters as tags or categories for the sets of transactions and/or entity information. In such a case, the transaction categorization platform may provide information identifying the sets of transactions, the entity information, and the corresponding tags or categories to the modification identification model, as described in more detail below.

Figure 1C:
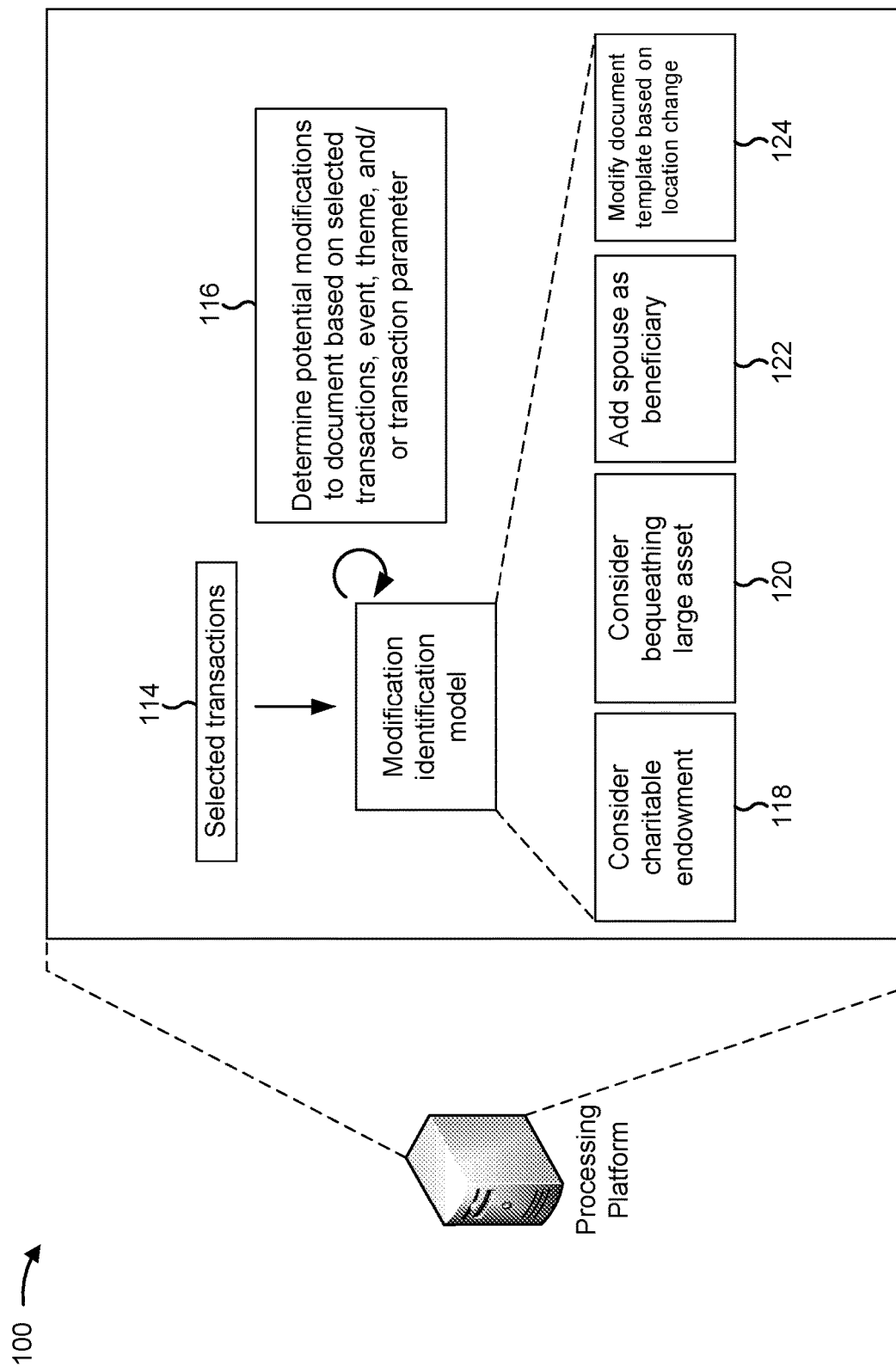

As shown in FIG. 1C, and by reference number 114, the processing platform may input, to a modification identification model (sometimes referred to as a second model), the selected transactions, the entity information, and/or information identifying the event, theme, or transaction parameter (e.g., the sets of transactions, the entity information, and/or the event, theme, or transaction parameter identified in connection with reference numbers 108, 110, and 112 of FIG. 1B). The modification identification model may output information identifying potential modifications to a document (e.g., the will). For example, as shown by reference number 116, the processing platform may determine potential modifications to a document based on the selected transactions, the entity information, the event, the theme, and/or the transaction parameters.

In some implementations, the processing platform may use the modification identification model to identify potential modifications. For example, the processing platform may train the modification identification model based on one or more parameters associated with identifying a potential modification based on transaction information and/or entity information, such as: sets of transactions associated with an event, theme, or transaction; entity information associated with an event, theme, or transaction; particular events, themes, or transactions; and/or the like. The processing platform may train the modification identification model using historical data associated with identification of potential modifications according to the one or more parameters. For example, the historical data may identify a particular potential modification that is to be identified when information associated with a particular event, theme, or transaction parameter and/or information identifying the particular event, theme, or transaction parameter is inputted to the modification identification model. Using the historical data and the one or more parameters as inputs to the modification identification model, the processing platform may train the model to identify potential modifications to a document (e.g., a will) based on the sets of transactions, the entity information, and information identifying the events, themes, and/or transactions associated with the set of transactions and the entity information. For a more detailed description of training a model using artificial intelligence, machine learning, and/or the like, refer to the description of the transaction categorization model above. At least some of the operations described in connection with the transaction categorization model may be performed in connection with training or using the modification identification model.

In some implementations, the modification identification model may identify a potential modification based on a set of transactions. For example, the modification identification model may be trained based on sets of transactions corresponding to potential modifications, and may identify a potential modification based on a set of transactions. In some implementations, the modification identification model may identify a potential modification based on tags or categories associated with a set of transactions. For example, the modification identification model may be trained based on one or more of the set of transactions and the tags or categories. In such a case, the modification identification model may determine potential modifications based on the tags or categories associated with the set of transactions. In some implementations, the modification identification model may identify a potential modification based on information identifying one or more events, themes, or transaction parameters associated with a set of transactions. For example, the modification identification model may be trained based on information identifying events, themes, and/or parameters and based on potential modifications associated with the events, themes, and/or parameters. Thus, in various implementations, the modification identification model may identify potential modifications based on any one or more of sets of transactions identified by the transaction categorization model, tags or categories identified by the transaction categorization model, and/or events, themes, or transactions associated with transaction parameters identified by the transaction categorization model.

As shown by reference number 118, one example of a potential modification is a charitable endowment. For example, when the processing platform determines that a set of transactions is associated with a theme relating to a charitable organization (e.g., using the transaction categorization model), then the processing platform may identify a potential modification to add a charitable endowment to the document for the charitable organization (e.g., using the modification identification model).

As shown by reference number 120, another example of a potential modification is a modification to transfer a large asset (e.g., a potential modification to bequeath the large asset). For example, when the processing platform determines that a set of transactions is associated with a transaction parameter (e.g., satisfies a threshold) corresponding to a large asset purchase (e.g., using the transaction categorization model), then the processing platform may identify a potential modification to handle the large asset (e.g., using the modification identification model).

As shown by reference number 122, a third example of a potential modification is a modification to add a beneficiary (e.g., a potential modification to add a spouse as a beneficiary of the document). For example, when the processing platform determines that a set of transactions or entity information is associated with an event (e.g., using the transaction categorization model), then the processing platform may identify a potential modification to add the beneficiary to the document (e.g., using the modification identification model).

As shown by reference number 124, a fourth example of a potential modification is a modification to a document template based on a location change. For example, when the processing platform determines that a set of transactions or entity information is associated with a location change (e.g., using the transaction categorization model), then the processing platform may identify a potential modification to use a document template that conforms with laws or requirements of a new location of the entity (e.g., using the modification identification model).

In this way, the processing platform may identify potential modifications for a document using one or more models and based on transaction information associated with an entity and entity information associated with the entity. By identifying the potential modifications using the one or more models, volumes of transaction information and entity information may be processed that would be impossible for human actors to process objectively. Thus, potential modifications may be identified for hundreds, thousands, or millions of documents, using transaction information and entity information specific to the entities associated with these documents. In this way, processing and other computing resources are conserved that would otherwise be used for human actors to attempt to identify potential modifications using a manual technique.

Figure 1D:
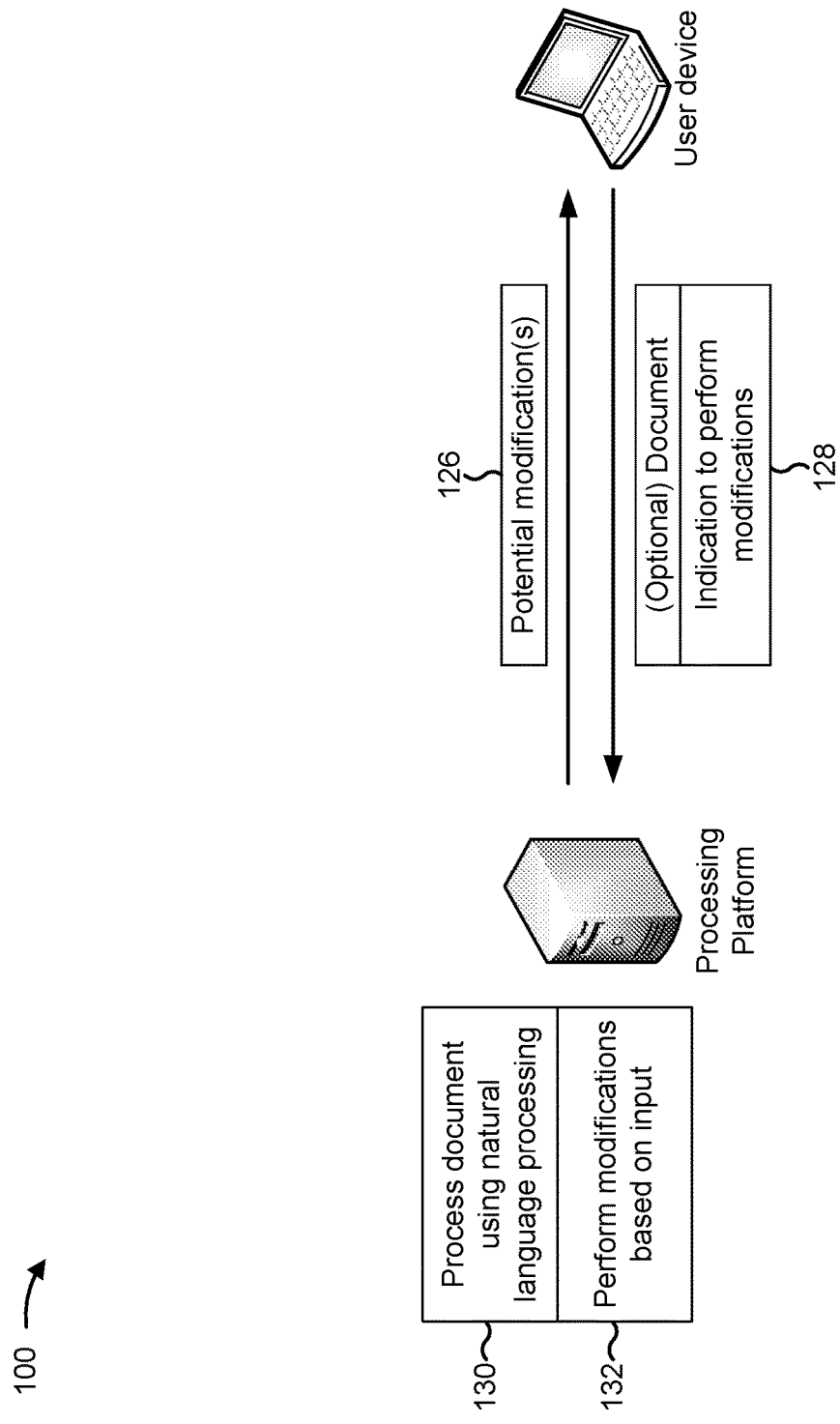

As shown in FIG. 1D, and by reference number 126, the processing platform may provide, to a user device, information identifying the potential modifications. For example, the processing platform may provide the information identifying the potential modifications to a user device associated with the entity. In some implementations, the processing platform may provide the information identifying the potential modifications to an administrator of the document, such as an attorney who represents the entity, a caretaker of the entity, and/or the like. In some implementations, the processing platform may provide information associated with the information identifying the potential modifications, such as information identifying the transactions or entity information used to determine the potential modifications, the events, themes, or transaction parameters associated with the potential modifications, and/or the like. In some implementations, the processing platform may provide the information identifying the potential modifications, and/or the information associated with the potential modifications, to a subject matter expert. For example, the subject matter expert may provide feedback regarding the potential modifications, which may be used to train the modification identification model and/or the transaction categorization model, as described in more detail elsewhere herein. Thus, accuracy of the models used by the processing platform may be improved, thereby conserving processor resources that would otherwise be used to determine inaccurate or suboptimal potential modifications.

As shown by reference number 128, in some implementations, the processing platform may receive the document from the user device. As further shown, the processing platform may receive an indication to perform one or more of the potential modifications on the document. For example, in some cases, the user device may provide the document for the processing platform to perform a modification of the potential modifications identified by the processing platform. As shown by reference number 130, the processing platform may process the document using a natural language processing technique, as described in more detail elsewhere herein. For example, the processing platform may process the document to identify sections of the document, an existing part of the document that relates to a potential modification, a jurisdiction associated with the document, whether a particular potential modification has already been performed in the document, and/or the like. By processing the document using the natural language processing technique, the processing platform enables machine processing of the document, thereby conserving resources (e.g., processor resources, time, etc.) that would otherwise be used to facilitate human processing of the document.

In some implementations, the processing platform may perform at least some of the operations described herein without receiving the document. For example, the processing platform may identify potential modifications using the models described herein without using the document, which may conserve storage and processing resources of the processing platform and which may provide increased data security for the entity. In some implementations, the processing platform may perform at least some of the operations described herein using the document. For example, the processing platform may identify potential modifications based on the document, which may improve accuracy of the determination of the potential modifications relative to determining the potential modifications without reference to the document.

As shown by reference number 132, the processing platform may perform one or more of the modifications identified by the indication shown by reference number 126 on the document. For example, the processing platform may store or have access to information identifying templates for modifications to the document. In some implementations, a template may be associated with a potential modification. The processing platform may select a template corresponding to a potential modification for which the processing platform has been instructed to perform the corresponding modification, and may perform the modification based on the template. For example, the processing platform may fill certain fields of the template with values determined based on the set of transactions and/or the entity information.

In some implementations, the processing platform may identify the template based on a location associated with the entity. For example, the location may be used to determine a jurisdiction, and the template may be selected based on the jurisdiction. In such a case, the template may be conformant with laws or requirements of the jurisdiction, thereby improving accuracy and effectiveness of the document and conserving resources that might otherwise be used to engage a local subject matter expert to perform an entirety of the modification (e.g., rather than only checking the modification).

In some implementations, the processing platform may select a template from a plurality of templates. For example, the processing platform may select a template based on an event, a theme, or a transaction parameter associated with a potential modification. As another example, the processing platform may select a template based on a characteristic of a set of transactions associated with the potential modifications. For example, if the processing platform identifies a particular asset associated with a set of transactions, and if the potential modification is to handle the particular asset, then the processing platform may select a template associated with bequeathing the particular asset. In some implementations, the processing platform may select a template based on a recipient or beneficiary. For example, the processing platform may identify a beneficiary or a set of beneficiaries (e.g., a family member, a charity, etc.), and may select the template based on the beneficiary or the set of beneficiaries (e.g., based on a number of beneficiaries, based on whether the beneficiary is a person or a legal entity, etc.). In this way, the processing platform may identify an appropriate template for performance of a modification, thereby conserving computing resources associated with manually identifying an appropriate template and/or manually performing the modification.

The processing platform may insert text that is generated based on the filled template into the document. In some implementations, the processing platform may identify a location in the document at which the text is to be inserted based on performing natural language processing of the document. For example, the processing platform may identify a section of the document that is pertinent to the modification, and may insert the text in the identified section of the document. In some implementations, the processing platform may provide the document, including the generated text, to a user device. For example, the user device may be associated with the entity, may be associated with a subject matter expert (e.g., to verify legal effectiveness of the modification, etc.), may be associated with a representative of the entity (e.g., an attorney of the entity, etc.), and/or the like.

In this way, the processing platform may perform a modification based on a potential modification identified using an entity's transaction information and entity information. Thus, the efficiency of administering a document, such as a will, is improved, and usefulness of the document may be improved. Furthermore, by determining the potential modifications using models that are trained and/or used by the processing platform, human subjectivity is removed from the process of determining potential modifications. Thus, processing resources and/or other resources associated with manual identification of potential modifications to the document and/or performance of a modification to the document are conserved. Furthermore, the effectiveness and usefulness of the will may be improved by performing the operations described herein, and more effective allocation of the entity's resources may be achieved.

As indicated above, FIGS. 1A-1D are provided merely as examples. Other examples are possible and may differ from what was described with regard to FIGS. 1A-1D.

Figure 2:
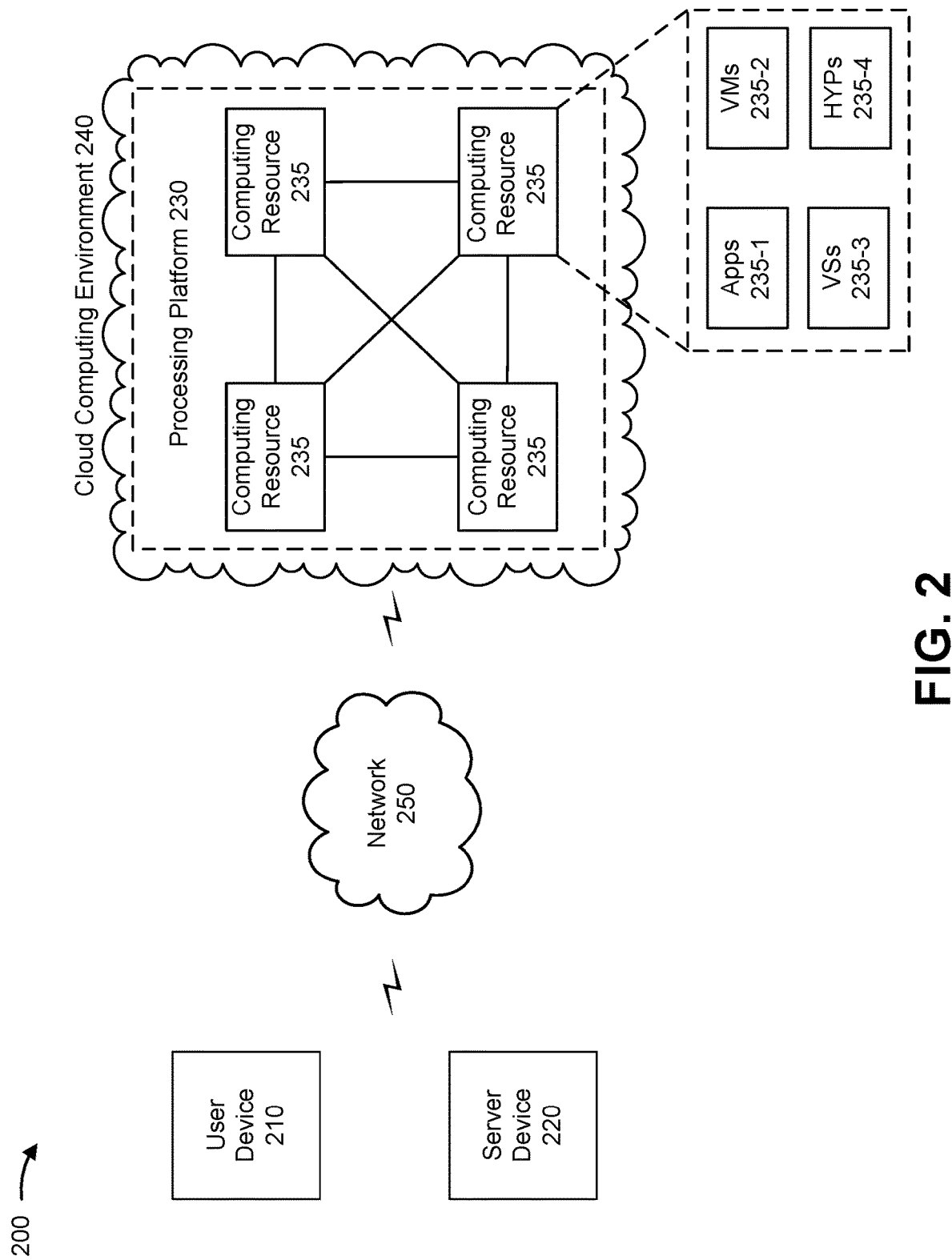
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a server device 220, a processing platform 230, a computing resource 235, a cloud computing environment 240, and a network 250. Devices of environment 200 may interconnect via wired connections, wireless connections, or a combination of wired and wireless connections.

User device 210 includes one or more devices capable of receiving, generating, storing, processing, and/or providing transaction information, entity information, and/or information associated with a document. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Server device 220 includes one or more devices capable of storing, processing, and/or routing information associated with transactions related to an entity. In some implementations, server device 220 may provide transaction information and/or entity information to processing platform 230. In some implementations, server device 220 may include a communication interface that allows server device 220 to receive information from and/or transmit information to other devices in environment 200.

Processing platform 230 includes one or more computing resources assigned to analysis of entity information and/or transaction information to determine modifications to documents. For example, processing platform 230 may be a platform implemented by cloud computing environment 240 that may perform analysis of entity information and/or transaction information to determine modifications to documents. In some implementations, processing platform 230 is implemented by computing resources 235 of cloud computing environment 240.

Processing platform 230 may include a server device or a group of server devices. In some implementations, processing platform 230 may be hosted in cloud computing environment 240. Notably, while implementations described herein describe processing platform 230 as being hosted in cloud computing environment 240, in some implementations, processing platform 230 may not be cloud-based or may be partially cloud-based.

Cloud computing environment 240 includes an environment that delivers computing as a service, whereby shared resources, services, etc. may be provided to processing platform 230. Cloud computing environment 240 may provide computation, software, data access, storage, and/or other services that do not require end-user knowledge of a physical location and configuration of a system and/or a device that delivers the services. As shown, cloud computing environment 240 may include processing platform 230 and computing resource 235.

Computing resource 235 includes one or more personal computers, workstation computers, server devices, or another type of computation and/or communication device. In some implementations, computing resource 235 may host processing platform 230. The cloud resources may include compute instances executing in computing resource 235, storage devices provided in computing resource 235, data transfer devices provided by computing resource 235, etc. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 includes one or more software applications that may be provided to or accessed by user device 210. Application 235-1 may eliminate a need to install and execute the software applications on user device 210. For example, application 235-1 may include software associated with processing platform 230 and/or any other software capable of being provided via cloud computing environment 240. In some implementations, one application 235-1 may send/receive information to/from one or more other applications 235-1, via virtual machine 235-2.

Virtual machine 235-2 includes a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program, and may support a single process. In some implementations, virtual machine 235-2 may execute on behalf of a user (e.g., user device 210), and may manage infrastructure of cloud computing environment 240, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored.

This may enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 may present a virtual operating platform to the guest operating systems, and may manage the execution of the guest operating systems. Multiple instances of a variety of operating systems may share virtualized hardware resources.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
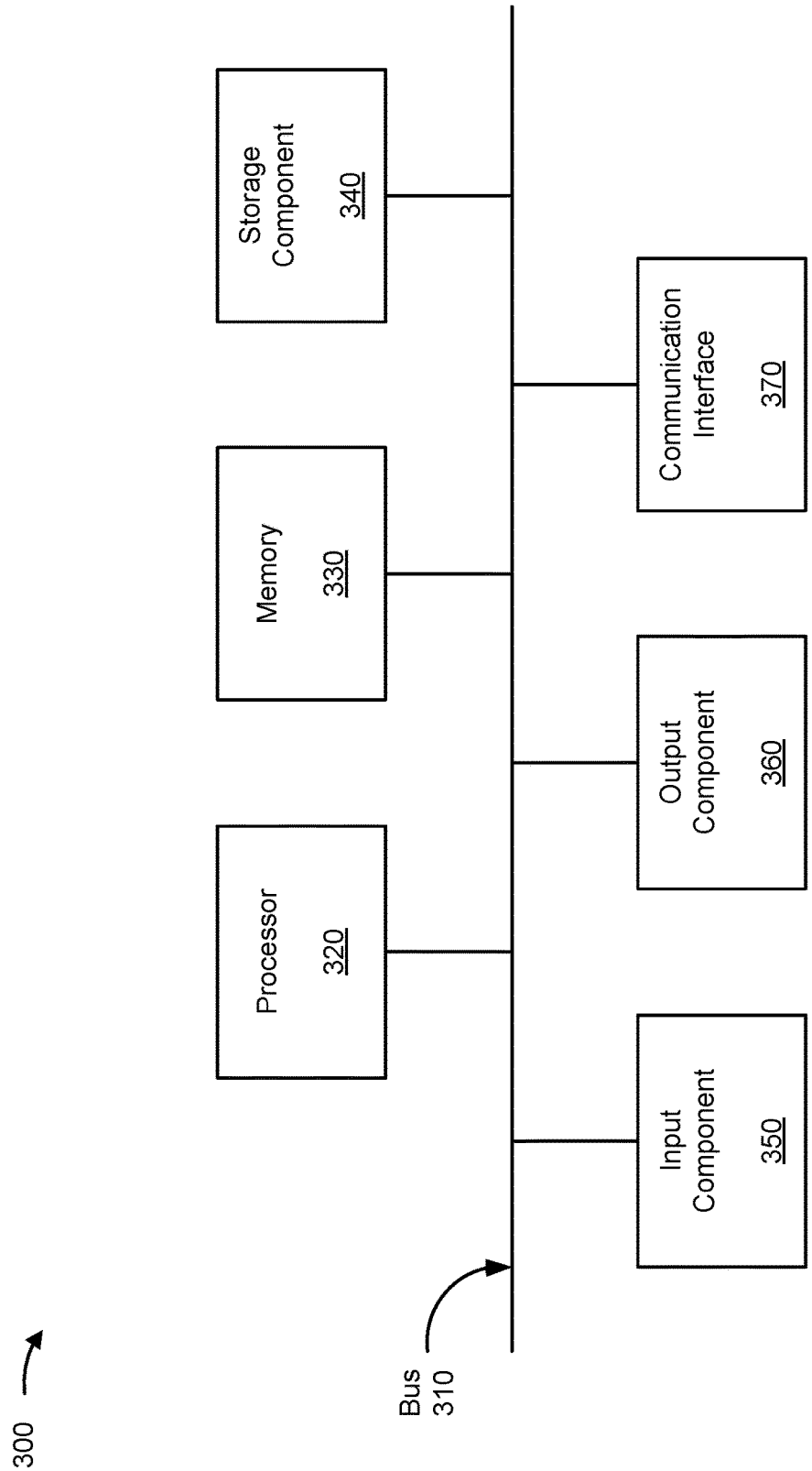
FIG. 3 is a diagram of example components of one or more devices of FIG. 2.

FIG. 3 is a diagram of example components of a device 300. Device 300 may correspond to user device 210, server device 220, processing platform 230, and/or computing resource 235. In some implementations, user device 210, server device 220, processing platform 230, and/or computing resource 235 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for updating a document based on transaction analysis. In some implementations, one or more process blocks of FIG. 4 may be performed by a processing platform (e.g., processing platform 230). In some implementations, one or more process blocks of FIG. 4 may be performed by another device or a group of devices separate from or including the processing platform, such as user device 210, server device 220, and/or the like.

As shown in FIG. 4, process 400 may include receiving transaction information for an entity, wherein the transaction information identifies a plurality of transactions associated with the entity (block 410). For example, the processing platform (e.g., using computing resource 235, processor 320, memory 330, storage component 340, input component 350, communication interface 370, and/or the like) may receive transaction information for an entity, as described above. In some implementations, the transaction information may identify a plurality of transactions associated with the entity.

As further shown in FIG. 4, process 400 may include receiving entity information associated with the entity (block 420). For example, the processing platform (e.g., using computing resource 235, processor 320, memory 330, storage component 340, input component 350, communication interface 370, and/or the like) may receive entity information associated with the entity, as described above.

As further shown in FIG. 4, process 400 may include processing, using a first model, the transaction information and the entity information to identify a selected set of transactions, wherein the selected set of transactions are a subset of the plurality of transactions (block 430). For example, the processing platform (e.g., using computing resource 235, processor 320, memory 330, storage component 340, and/or the like) may process, using a first model, the transaction information and the entity information to identify a selected set of transactions, as described above. In some implementations, the selected set of transactions may be a subset of the plurality of transactions. In some implementations, the first model may receive, as input, the transaction information and the entity information. In some implementations, the first model may output information identifying the selected set of transactions based on the selected set of transactions being associated with an event, a theme, or a transaction parameter.

As further shown in FIG. 4, process 400 may include determining, using a second model, one or more potential modifications to a document based on the selected set of transactions (block 440). For example, the processing platform (e.g., using computing resource 235, processor 320, memory 330, storage component 340, and/or the like) may determine, using a second model, one or more potential modifications to a document based on the selected set of transactions, as described above. In some implementations, the second model may receive the information identifying the selected set of transactions or information identifying the event, the theme, or the transaction parameter. In some implementations, the second model may output information identifying the one or more potential modifications.

As further shown in FIG. 4, process 400 may include providing, via a network, information identifying the one or more potential modifications (block 450). For example, the processing platform (e.g., using computing resource 235, processor 320, memory 330, storage component 340, input component 350, output component 360, communication interface 370, and/or the like) may provide, via a network, information identifying the one or more potential modifications, as described above.

Process 400 may include additional implementations, such as any single implementation or any combination of implementations described below and/or in connection with one or more other processes described elsewhere herein.

In some implementations, the processing platform may train the second model using a machine learning technique, where the second model is trained using a training set of documents and corresponding sets of transactions. In some implementations, the processing platform may determine a result associated with the one or more potential modifications, where the result indicates whether the one or more potential modifications were performed or accepted with regard to the document, and may update the second model based on the result and using a machine learning technique.

In some implementations, the processing platform may access, based on the entity information, a device to obtain a messaging history and/or an email history of the entity, and, when determining the one or more potential modifications to the document, the processing platform may analyze, using the second model, the messaging history and/or the email history of the entity.

In some implementations, the processing platform may receive information identifying a location or jurisdiction of the entity, and, when determining the one or more potential modifications to the document, the processing platform may determine a potential modification, of the one or more potential modifications, based on the location or the jurisdiction of the entity.

In some implementations, the location or the jurisdiction may be determined by the first model based on the transaction information or the entity information. In some implementations, the processing platform may perform a potential modification of the one or more potential modifications based on receiving an input regarding the potential modification.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for updating a document based on transaction analysis. In some implementations, one or more process blocks of FIG. 5 may be performed by a processing platform (e.g., processing platform 230). In some implementations, one or more process blocks of FIG. 5 may be performed by another device or a group of devices separate from or including the processing platform, such as user device 210, server device 220, and/or the like.

As shown in FIG. 5, process 500 may include receiving transaction information for an entity, wherein the transaction information identifies a plurality of transactions associated with the entity (block 510). For example, the processing platform (e.g., using computing resource 235, processor 320, memory 330, storage component 340, input component 350, communication interface 370, and/or the like) may receive transaction information for an entity, as described above. In some implementations, the transaction information may identify a plurality of transactions associated with the entity.

As further shown in FIG. 5, process 500 may include receiving entity information associated with the entity (block 520). For example, the processing platform (e.g., using computing resource 235, processor 320, memory 330, storage component 340, input component 350, communication interface 370, and/or the like) may receive entity information associated with the entity, as described above.

As further shown in FIG. 5, process 500 may include identifying, using a first model, a selected set of transactions based on the transaction information and the entity information (block 530). For example, the processing platform (e.g., using computing resource 235, processor 320, memory 330, storage component 340, and/or the like) may identify, using a first model, a selected set of transactions based on the transaction information and the entity information, as described above. In some implementations, the first model may output information identifying the selected set of transactions based on the selected set of transactions being associated with an event, a theme, or a transaction parameter.

As further shown in FIG. 5, process 500 may include determining, using a second model, one or more potential modifications to a document based on the selected set of transactions (block 540). For example, the processing platform (e.g., using computing resource 235, processor 320, memory 330, storage component 340, and/or the like) may determine, using a second model, one or more potential modifications to a document based on the selected set of transactions, as described above. In some implementations, the second model may receive the information identifying the selected set of transactions or information identifying the event, the theme, or the transaction parameter. In some implementations, the second model may output information identifying the one or more potential modifications.

As further shown in FIG. 5, process 500 may include providing information identifying the one or more potential modifications (block 550). For example, the processing platform (e.g., using computing resource 235, processor 320, memory 330, storage component 340, input component 350, output component 360, communication interface 370, and/or the like) may provide information identifying the one or more potential modifications, as described above.

Process 500 may include additional implementations, such as any single implementations or any combination of implementations described below and/or in connection with one or more other processes described elsewhere herein.

In some implementations, the transaction parameter may be based on a threshold transaction size, where the selected set of transactions satisfy the threshold transaction size. In some implementations, a potential modification, of the one or more potential modifications, may relate to adding, removing, or modifying a bequest, inheritance, or endowment in the document. In some implementations, a recipient of the bequest, inheritance, or endowment may be associated with a counterparty of the selected set of transactions.

In some implementations, the processing platform may determine, based on the transaction information or the entity information, that the entity is associated with a change of a location or a jurisdiction, and, when determining the one or more potential modifications, the processing platform may determine a potential modification, of the one or more potential modifications, based on the change of the location or the jurisdiction of the entity.

In some implementations, the processing platform may identify relevant entity information, of the entity information, where the relevant entity information is associated with the selected set of transactions, and may determine the event or the theme based on the relevant entity information. In some implementations, when identifying the selected set of transactions, the processing platform may categorize or tag the plurality of transactions, where the selected set of transactions are identified based on categories or tags of the selected set of transactions.

Although FIG. 5 shows example blocks of process 400, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for updating a document based on transaction analysis. In some implementations, one or more process blocks of FIG. 6 may be performed by a processing platform (e.g., processing platform 230). In some implementations, one or more process blocks of FIG. 6 may be performed by another device or a group of devices separate from or including the processing platform, such as user device 210, server device 220, and/or the like.

As shown in FIG. 6, process 600 may include receiving transaction information for an entity, wherein the transaction information identifies a plurality of transactions associated with the entity (block 610). For example, the processing platform (e.g., using computing resource 235, processor 320, memory 330, storage component 340, input component 350, communication interface 370, and/or the like) may receive transaction information for an entity, as described above. In some implementations, the transaction information may identify a plurality of transactions associated with the entity.

As further shown in FIG. 6, process 600 may include receiving entity information associated with the entity (block 620). For example, the processing platform (e.g., using computing resource 235, processor 320, memory 330, storage component 340, input component 350, communication interface 370, and/or the like) may receive entity information associated with the entity, as described above.

As further shown in FIG. 6, process 600 may include processing, using a first model, the transaction information and the entity information to identify a selected set of transactions that are associated with an event, a theme, or a transaction parameter (block 630). For example, the processing platform (e.g., using computing resource 235, processor 320, memory 330, storage component 340, and/or the like) may process, using a first model, the transaction information and the entity information to identify a selected set of transactions that are associated with an event, a theme, or a transaction parameter, as described above.

As further shown in FIG. 6, process 600 may include determining, using a second model, one or more potential modifications to a document based on the selected set of transactions (block 640). For example, the processing platform (e.g., using computing resource 235, processor 320, memory 330, storage component 340, and/or the like) may determine, using a second model, one or more potential modifications to a document based on the selected set of transactions, as described above. In some implementations, the second model receives the information identifying the selected set of transactions or information identifying the event, the theme, or the transaction parameter. In some implementations, the second model outputs information identifying the one or more potential modifications.

As further shown in FIG. 6, process 600 may include providing information identifying the one or more potential modifications (block 650). For example, the processing platform (e.g., using computing resource 235, processor 320, memory 330, storage component 340, input component 350, output component 360, communication interface 370, and/or the like) may provide information identifying the one or more potential modifications, as described above.

Process 600 may include additional implementations, such as any single implementation or any combination of implementations described below and/or in connection with one or more other processes described elsewhere herein.

In some implementations, the processing platform may receive the document, and may identify attributes of the document using a natural language processing technique, and, when determining the one or more potential modifications, the processing platform may determine the one or more potential modifications based on the attributes of the document.

In some implementations, at least two transactions of the selected set of transactions may be associated with different counterparties. In some implementations, the plurality of transactions may include financial or consumer transactions.

In some implementations, when receiving the transaction information, the processing platform may receive the transaction information from multiple, different sources as a data stream, where the entity information is received from at least one source of the multiple, different sources. In some implementations, the event may include a marriage, a divorce, a death, a relocation, and/or an asset purchase or sale that satisfies a threshold identified by the transaction parameter.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

To the extent implementations described herein collect, store, or employ personal information of individuals, it is to be understood that such information shall be collected, stored, or used in accordance with all applicable laws concerning protection of personal information. The collection, storage, and/or use of such information may be subject to consent of the individual to such activity, for example, through "opt-in" or "opt-out" processes as can be appropriate for the situation, type of information, and regulatory landscape. The storage and use of personal information may be in an appropriately secure manner reflective of the type of information, for example, through various encryption and anonymization techniques for particularly sensitive information.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a platform, transaction information;
   performing, by the platform, dimensionality reduction to reduce the transaction information,
      wherein a portion of the transaction information is used to generate a first model;
   identifying, by the platform and using the first model, one or more transactions that are associated with a theme based on the transaction information,
      wherein the first model receives, as input, the transaction information, and
      wherein the first model outputs information identifying the one or more transactions based on the one or more transactions being associated with the theme;
   determining, by the platform and using a second model, one or more potential modifications to a document based on the one or more transactions,
      wherein the second model receives the information identifying the one or more transactions or information identifying the theme, and
      wherein the second model outputs information identifying the one or more potential modifications; and
   providing, by the platform and via a network, the information identifying the one or more potential modifications.

2. The method of claim 1, further comprising:
   performing a preprocessing operation when generating the first model by preprocessing the transaction information to remove one or more of:
   non-ASCII characters,
   white spaces, or
   confidential information.

3. The method of claim 1, where determining the one or more potential modifications to the document comprises:
determining the one or more potential modifications based on a pattern of related transactions.

4. The method of claim 1, wherein the theme is associated with one of:
a charitable organization,
legal services, or
education.

5. The method of claim 1, wherein another potential modification, of the one or more potential modifications, relates to adding, removing, or modifying a charitable endowment.

6. The method of claim 1, further comprising:
retrieving entity information associated with the transaction information; and
generating the first model by portioning the transaction information, the entity information, and information identifying the theme into a training set, a validation set, and a test set.

7. The method of claim 1, further comprising:
performing another potential modification of the one or more potential modifications based on receiving an input regarding the other potential modification.

8. A device, comprising:
one or more memories; and
one or more processors, coupled to the one or more memories, configured to:
receive transaction information;
reduce the transaction information,
wherein a portion of the transaction information is used to generate a first model;
identify, using the first model, one or more transactions that are associated with a theme based on the transaction information,
wherein the first model receives, as input, the transaction information, and
wherein the first model outputs information identifying the one or more transactions based on the one or more transactions being associated with the theme;
determine, using a second model, one or more potential modifications to a document based on the one or more transactions,
wherein the second model receives the information identifying the one or more transactions or information identifying the theme, and
wherein the second model outputs information identifying the one or more potential modifications;
provide the information identifying the one or more potential modifications; and
update the second model based on determining a result associated with the one or more potential modifications and using a machine learning technique.

9. The device of claim 8, wherein the one or more processors are further configured to:
retrieve entity information associated with the transaction information; and
generate the first model by portioning the transaction information, the entity information, and information identifying the theme into a training set, a validation set, and a test set.

10. The device of claim 8, whereon the one or more processors, when determining the one or more potential modifications to the document, are to:
determine the one or more potential modifications based on a pattern of related transactions.

11. The method of claim 1, wherein the theme is associated with a charitable organization.

12. The device of claim 8, wherein another potential modification, of the one or more potential modifications, relates to adding, removing, or modifying a charitable endowment.

13. The device of claim 8, wherein the one or more processors are further configured to:
perform another potential modification of the one or more potential modifications based on receiving an input regarding the other potential modification.

14. The device of claim 8, wherein the one or more processors are further configured to:
receive the transaction information from multiple, different sources as a data stream.

15. A non-transitory computer-readable medium storing instructions, the instructions comprising:
one or more instructions that, when executed by one or more processors, cause the one or more processors to:
receive transaction information;
identify, using a first model, one or more transactions that are associated with a theme based on the transaction information,
wherein the first model receives, as input, the transaction information, and
wherein the first model outputs information identifying the one or more transactions based on the one or more transactions being associated with the theme;
determine, using a second model, one or more potential modifications to a document based on the one or more transactions,
wherein the second model receives the information identifying the one or more transactions or information identifying the theme, and
wherein the second model outputs information identifying the one or more potential modifications; and
provide, via a network, the information identifying the one or more potential modifications.

16. The non-transitory computer-readable medium of claim 15, wherein the one or more instructions, when executed by the one or more processors, cause the one or more processors to:
perform a preprocessing operation when generating the first model by preprocessing the transaction information to remove confidential information.

17. The non-transitory computer-readable medium of claim 15, wherein the one or more instructions, that cause the one or more processors to determine the one or more potential modifications to the document, cause the one or more processors to:
determine the one or more potential modifications based on a pattern of related transactions.

18. The non-transitory computer-readable medium of claim 15, wherein another potential modification, of the one or more potential modifications, relates to modifying a charitable endowment.

19. The non-transitory computer-readable medium of claim 15, wherein the one or more instructions, when executed by the one or more processors, cause the one or more processors to:
retrieve entity information associated with the transaction information; and generate the first model by portioning the transaction information, the entity information, and information identifying the theme into a training set, a validation set, and a test set.

20. The non-transitory computer-readable medium of claim 15, wherein the one or more instructions, when executed by the one or more processors, cause the one or more processors to:
perform another potential modification of the one or more potential modifications based on receiving an input regarding the other potential modification.

* * * * *